United States Patent
Sakaguchi et al.

(10) Patent No.: US 7,633,027 B2
(45) Date of Patent: Dec. 15, 2009

(54) SWITCH MECHANISM USABLE UNDERWATER

(75) Inventors: Katsuhisa Sakaguchi, Hachioji (JP); Naoki Matsumoto, Hachioji (JP); Tsuyoshi Hirabayashi, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/192,617

(22) Filed: Aug. 15, 2008

(65) Prior Publication Data

US 2009/0014297 A1  Jan. 15, 2009

Related U.S. Application Data

(62) Division of application No. 11/281,650, filed on Nov. 17, 2005, now Pat. No. 7,426,338.

(51) Int. Cl.
*H01H 13/06* (2006.01)
(52) U.S. Cl. .................... 200/302.2; 200/302.1
(58) Field of Classification Search ............. 200/5 A, 200/5 R, 6 A, 4, 18, 310–314, 341–345, 339, 200/302.1–302.3
See application file for complete search history.

(56) References Cited

U.S. PATENT DOCUMENTS

| | | | |
|---|---|---|---|
| 3,019,715 A | | 2/1962 | Arnold |
| 3,653,306 A | * | 4/1972 | Takahama ..................... 396/29 |
| 3,950,773 A | * | 4/1976 | Winkler et al. .............. 396/502 |
| 4,041,507 A | * | 8/1977 | Chan et al. ..................... 396/28 |
| 4,097,878 A | * | 6/1978 | Cramer ......................... 396/27 |
| 4,244,591 A | | 1/1981 | Umetsu |
| 4,372,664 A | * | 2/1983 | Shimizu ...................... 396/535 |
| 4,456,357 A | * | 6/1984 | Sunouchi et al. ............ 396/263 |
| 5,066,965 A | * | 11/1991 | Tanaka et al. ................. 396/29 |
| 5,262,814 A | * | 11/1993 | Nishio et al. ................. 396/537 |
| 5,298,928 A | * | 3/1994 | Suzuki et al. .................. 396/26 |
| 5,305,030 A | * | 4/1994 | Yokoyama et al. ............. 396/27 |
| 5,305,032 A | * | 4/1994 | Arai ............................. 396/27 |
| 5,514,843 A | | 5/1996 | Wilfong et al. |
| 5,897,225 A | * | 4/1999 | Rieger et al. ................... 396/29 |
| 6,556,786 B2 | | 4/2003 | Taguchi et al. |
| 6,603,083 B2 | * | 8/2003 | Amari et al. ................. 200/5 D |
| 6,963,039 B1 | * | 11/2005 | Weng et al. ............... 200/302.1 |
| 7,214,896 B2 | | 5/2007 | Yamaguchi |
| 7,297,881 B2 | | 11/2007 | Yamasaki |

(Continued)

FOREIGN PATENT DOCUMENTS

JP  51-111343  9/1976

*Primary Examiner*—Michael A Friedhofer
*Assistant Examiner*—Lisa N Klaus
(74) *Attorney, Agent, or Firm*—Volpe and Koenig, P.C.

(57) ABSTRACT

A switch mechanism usable underwater including a cover serving as an exterior member, a shaft member displaceable in a longitudinal direction and fitted into a shaft hole having substantially the same cross-sectional area provided in the cover, an O-ring maintaining a water-tight sliding seal between the shaft member and the shaft hole, and a lever member movable about an axis for moving the shaft member by application of a pressing force applied to the lever member in a first direction against a force of a bias member, the pressing force being applied at a first point which is a first distance from said axis, the lever member engaging the shaft at a second point a second distance from said axis which is less than said first distance to move the lever member in a second direction opposite said first direction when the pressing force is removed.

14 Claims, 10 Drawing Sheets

U.S. PATENT DOCUMENTS

| | | |
|---|---|---|
| 7,312,411 B2 | 12/2007 | Osada |
| 7,339,130 B2 | 3/2008 | Ho |
| 7,339,131 B2 | 3/2008 | Yamamoto et al. |
| 7,355,137 B2 | 4/2008 | Kawasaki et al. |
| 7,368,672 B2 | 5/2008 | Yanai et al. |
| 7,426,338 B2 | 9/2008 | Matsumoto et al. |
| 7,436,391 B2 | 10/2008 | Bilger et al. |
| 7,442,894 B2 | 10/2008 | Villain et al. |
| 2006/0008262 A1 | 1/2006 | Watanabe et al. |

\* cited by examiner

SWITCH MECHANISM USABLE UNDERWATER

CROSS REFERENCE TO RELATED APPLICATIONS

This application is a Divisional of U.S. patent application Ser. No. 11/281,650, filed Nov. 17, 2005, now U.S. Pat. No. 7,426,338 which claims priority of Japanese Application No. 2004-344649 filed in Japan on Nov. 29, 2004 and Japanese Application No. 2004-344651 filed in Japan on Nov. 29, 2004, which are incorporated by reference as if fully set forth.

BACKGROUND OF INVENTION

1. Field of the Invention

The present invention relates to a switching mechanism usable underwater, and more particularly to a switching mechanism usable underwater for use in a device capable of being not only used on land but also used underwater.

2. Description of the Related Art

Devices used underwater, for example, such as underwater cameras or the like are provided with various kinds of operating switches that can be operated underwater. In contrast to operating switches that are only used on land, such an operating switch used underwater is required to be designed not only to have water-tightness but also to have water-tightness withstanding up to a predetermined water pressure. In general, when the operating switch used underwater is designed, to what extent of a water depth the operating switch can withstand, is decided in consideration of a usage pattern, size, weight, and a price of the device. The deeper the designed depth of water, the larger the water pressure applied to the device. However, because hydrostatic pressure is uniformly applied to an entire surface of the device, the hydrostatic pressure is applied not only to an exterior package of the device but also to the operating switch, as it is obvious.

In a case when the operating switch is that of a pressure-type, it is possible that the operating switch is turned on/off by pressing force caused by the water pressure. Therefore, the pressure-type switch is configured to generate biasing force that can withstand the water pressure by, for example, providing a spring or the like inside thereof. In this case, the deeper the water depth designed for the device, the stronger the biasing force necessary for the device. Therefore, when such a device is used on land or underwater in relatively shallow water, large pressing force is required to operate the operating switch. In addition, because the required pressing force to operate such an operating switch varies corresponding to the water depth, operability of the operating switch is not good.

As an art that can improve these shortcomings, for example, in Japanese Unexamined Utility Model Registration Application Publication No. 51-111343, a shutter release of a waterproof camera, in which a balancing pressure receiving face having approximately the same area as that of a pressure receiving face of a pressing portion is provided in a shutter release member so as to balance water pressure applied to both the pressure receiving faces, is described. More concretely, the pressure receiving face of the pressing portion is disposed at an upper face side of the waterproof camera and the balancing pressure receiving face is disposed at a lower face side thereof, respectively and the shutter release member is formed into a longitudinal shape that connects the upper face and the lower face of the waterproof camera. In addition, the shutter release member is configured to be movable in a vertical direction connecting the upper face and the lower face of the waterproof camera. According to such a configuration, the shutter release member is prevented from being improperly pressed by the water pressure regardless of the water depth.

SUMMARY OF THE INVENTION

Accordingly, it is an object of the present invention to provide a switch mechanism usable underwater capable of saving space and provided with a pressing operation member without being improperly operated by water pressure.

Further, another object of the present invention is to provide a switch mechanism usable underwater capable of saving the space and provided with a plurality of pressing operation members without being improperly operated by water pressure and required pressing force to operate the same does not depend on a water depth.

Accordingly, in an aspect, the present invention provides a switch mechanism usable underwater including an exterior member having a first hole and a second hole, a first pressing operation member being watertight against the first hole of the exterior member, a second pressing operation member being watertight against the second hole of the exterior member, first switch means being turned on/off by the first pressing operation member, second switch means being turned on/off by the second pressing operation member, and a lever member being rotatable around a fulcrum being provided in the exterior member, pressing the first pressing operation member at a first contact point when rotating in a first direction, and pressing the second operation member at a second contact point when rotating in a second direction opposite to the first direction, in which, when a cross-sectional area at a boundary of water and air in a state of the first pressing operation member being inserted into the first hole is defined as $S1$, and a cross-sectional area at a boundary of water and air in a state of the second pressing operation member being inserted into the second hole is defined as $S2$, and in which, when a distance between the fulcrum and the first contact point is defined as $R1$, and a distance between the fulcrum and the second contact point is defined as $R2$, and in which, when static frictional force occurring when the first pressing operation member is forced into the first hole is defined as $F1$, and static frictional force occurring when the second pressing operation member is forced into the second hole is defined as $F2$, and in which, when the water pressure is defined as $P$, the lever member has a rotational balance of the water pressure in which the following mathematical formula is satisfied.

$$P \times S1 \times R1 + F1 \times R1 = P \times S2 \times R2 + F2 \times R2$$

In another aspect, the present invention provides a switch mechanism usable underwater including, an exterior member having a first hole and a second hole, a pressing operation member being watertight against the first hole of the exterior member, switch means being turned on/off by a movement of the pressing operation member, water pressure detecting means being watertight against the second hole of the exterior member, and a lever member disposed to be freely rotatable around a rotation supporting portion disposed inside of the exterior member, for applying detected force of a water pressure occurring when the water pressure detecting means is pressed to the pressing operation member by the water pressure underwater, in which the detected force of the water pressure is set to be equal to or greater than resultant force of an external force being received by the pressing operation member from the water pressure as an external pressure and internal force being received by the pressing operation member from the internal member as force applying in a direction opposite to an applying direction of the external pressure.

In still another aspect, the present invention provides a switch mechanism usable underwater including, a pressing operation member capable of being moved by external operation, being watertight against an exterior member, and receiving a first force occurring at a first cross-sectional area of a boundary between water and air underwater corresponding to a water pressure, switch means being turned on/off by a movement of the pressing operation member, force of water pressure generating member being disposed to be watertight against the exterior member, having a second cross-sectional area at a boundary of the water and the air, and generating a second force at a second cross-sectional area of a boundary between the water and the air underwater corresponding to the water pressure, and a transmitting member for transmitting the second force to the pressing operation member, in which the second force generated by the force of water pressure generating member is set to be greater than the first force received by the pressing operation member by configuring the second cross-sectional area of the force of water pressure generating member to be greater than the first cross-sectional area of the pressing operation member.

In still a further aspect, the present invention provides a switch mechanism usable underwater including, an exterior member having a first hole and a second hole, a pressing operation member being watertight against the first hole of the exterior member, capable of being operated from outside of the exterior member, switch means being turned on/off by the pressing operation member, a water pressure detecting member being watertight against the second hole of the exterior member, and generating force corresponding to the water pressure under water, and a lever member being rotatable around a fulcrum, for approximately balancing the water pressure applied to the pressing operation member underwater by receiving force that occurs at the water pressure detecting member at a point of force and applying the force to the pressing operation member at a point of action.

The above and other objects, features and advantages of the invention will become more clearly understood from the following description referring to the accompanying drawings.

BRIEF DESCRIPTION OF THE DRAWING(S)

DETAILED DESCRIPTION OF THE PREFERRED EMBODIMENTS

Hereinbelow, an embodiment of the present invention is explained referring to accompanying drawings.

Figure 1:
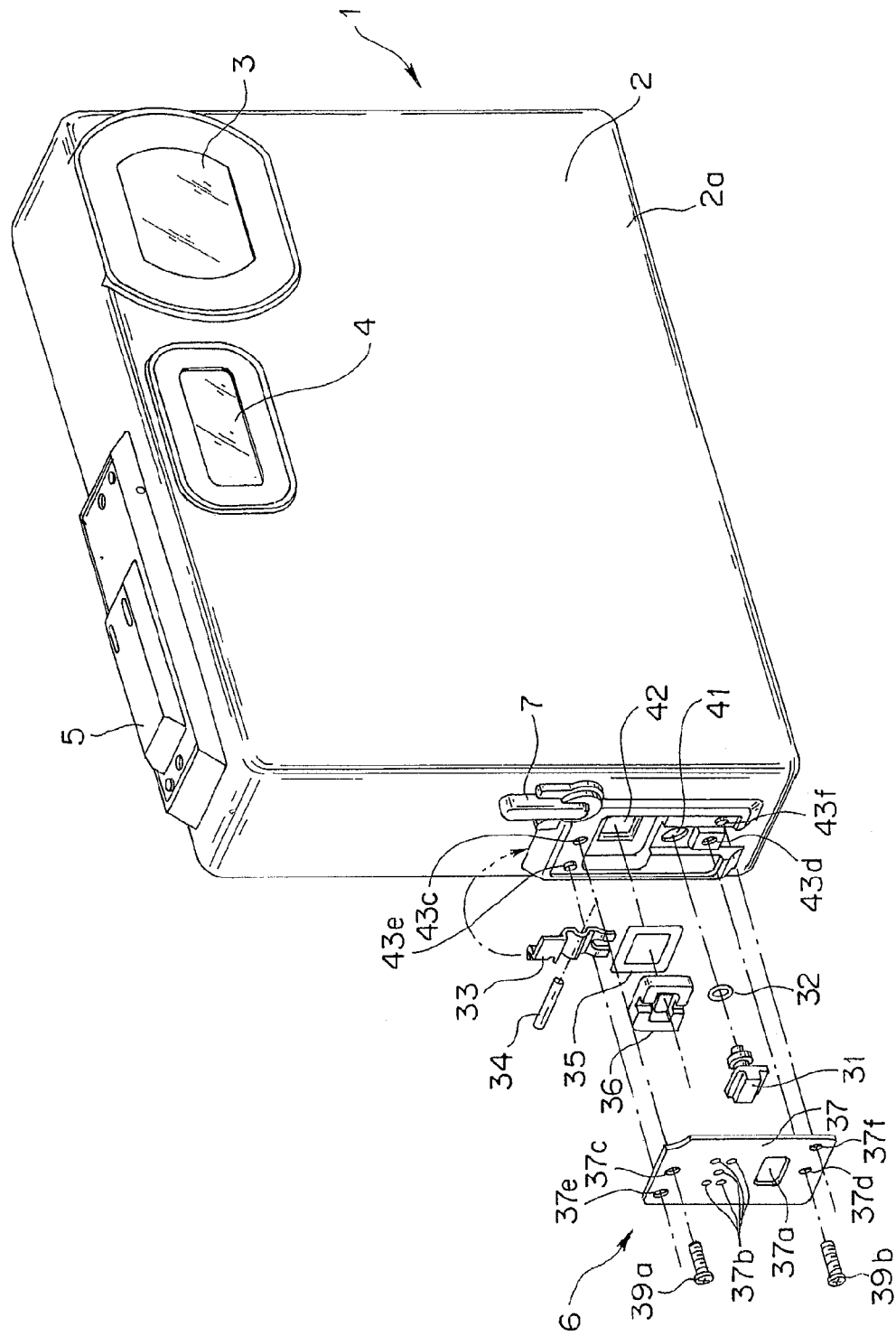
FIG. 1 is a partially exploded perspective view illustrating a configuration of an underwater camera of the present invention, viewed from the front side.
Figure 2:
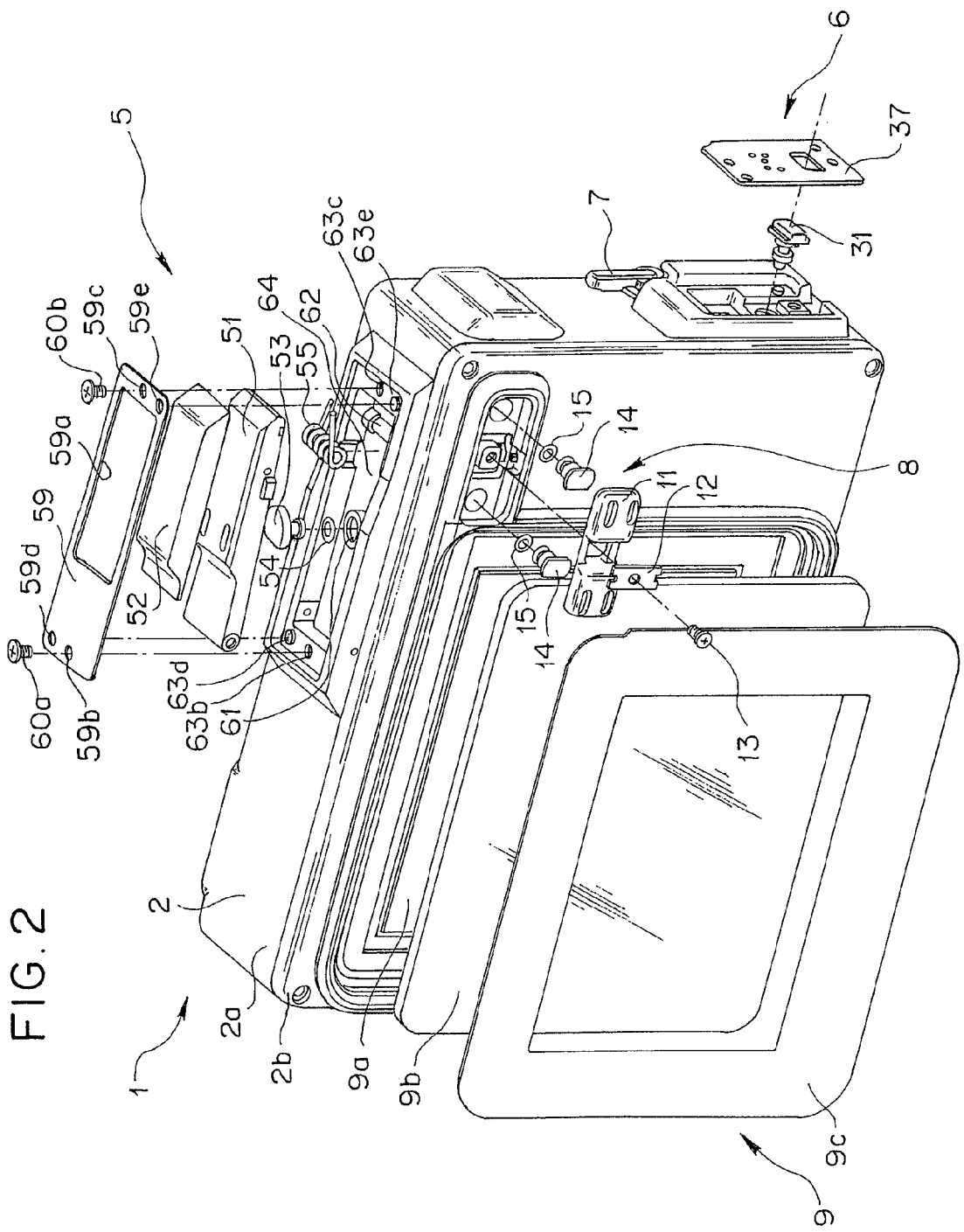
FIG. 2 is a partially exploded perspective view illustrating the configuration of the underwater camera, viewed from the backside.

FIGS. 1 through 17 illustrate the embodiment of the present invention. FIG. 1 is a partially exploded perspective view illustrating a configuration of an underwater camera 1 of the present invention, viewed from the front side and FIG. 2 is a partially exploded perspective view illustrating the configuration of the underwater camera 1, viewed from the backside.

The camera 1 is a so-called underwater camera which is configured to be usable not only on land but also underwater up to a predetermined water depth.

An exterior member 2 of the camera 1 comprises a front cover 2a and a rear cover 2b, sealing each other in a watertight manner and fixing together by using screws or the like.

A shooting optical system 3 serving as a zoom optical system having a variable focal length is disposed at a right upper corner of a front face of the camera 1, viewed from a front side (an object side), and a stroboscopic light 4 for irradiating flash light is disposed at a center of the upper part of the front face of the camera 1, respectively.

A release button 5 for inputting an instruction for shooting operation is disposed at a position in a top face of the camera 1 at which a photographer can pressingly operate the release button 5 with a right-hand index finger or the like.

A power source button 6 for turning on/off a power source of the camera 1 and a mode switching lever 7 for switching an operation mode of the camera 1 among a still image shooting mode, an moving image shooting mode, and a play back mode are disposed at a lower side of a right side face (right side, viewed from an operating photographer) of the camera 1, respectively.

A zoom lever 8 for changing the focal length of the shooting optical system 3 from a telescopic focal length side to a wide angle focal length side is disposed at a right upper corner of a rear side of the camera 1 and a display screen 9 for displaying a shot still image and a shot moving image, and for displaying various information relating to the camera 1 is disposed at most of an area of a rear face of the camera 1 at the left side from the zoom lever 8, respectively.

The above-mentioned shooting optical system 3, the stroboscopic light 4, the release button 5, the power source button 6, the mode switching lever 7, the zoom lever 8, and the display screen 9 are of course designed to be watertight against the exterior member 2.

The display screen 9 is configured by covering, in a watertight manner, a display element 9a formed of, for example, a TFT (Thin Film Transistor) or the like with a window glass 9b having resistance characteristics for water pressure and attaching a window cover 9c from outside of the window glass 9b, as illustrated in FIG. 2.

Figure 3:
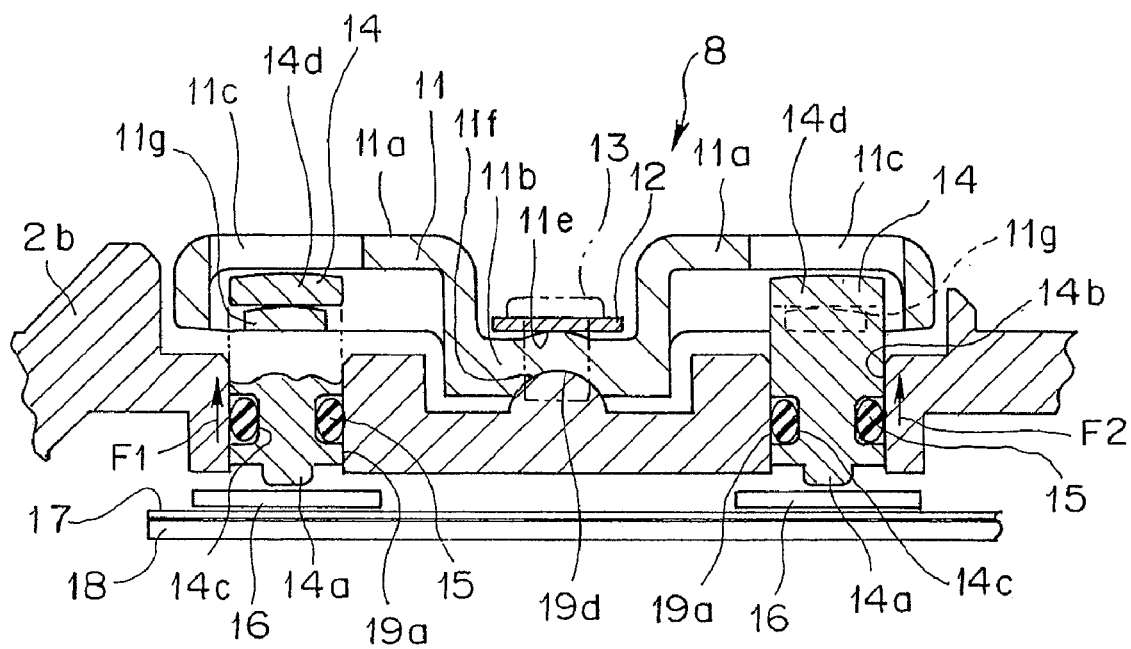
FIG. 3 is a cross-section by a cutting line 3-3 in FIG. 5 illustrating a configuration of a zoom lever.
Figure 4:
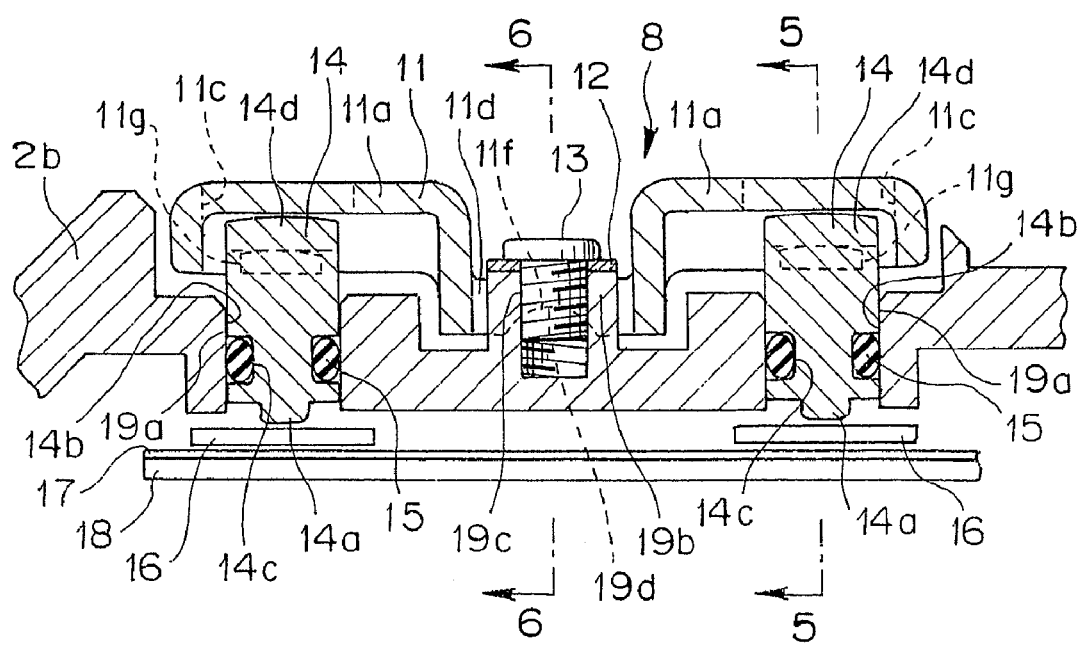
FIG. 4 is a cross-section by a cutting line 4-4 in FIG. 5 illustrating a configuration of the zoom lever.
Figure 5:
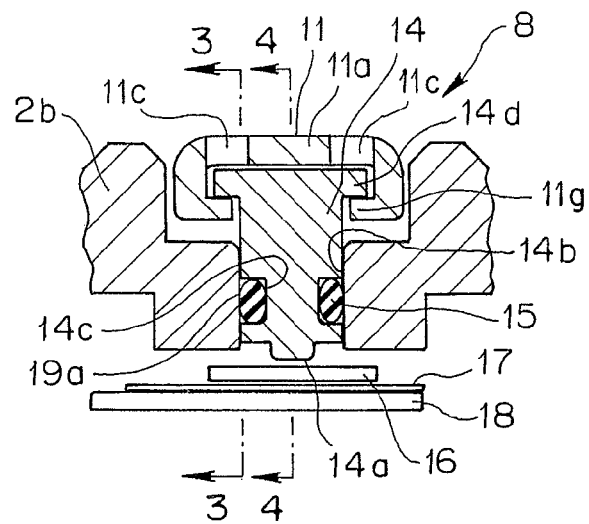
FIG. 5 is a cross-section by a cutting line 5-5 in FIG. 4 illustrating a configuration of the zoom lever.
Figure 6:
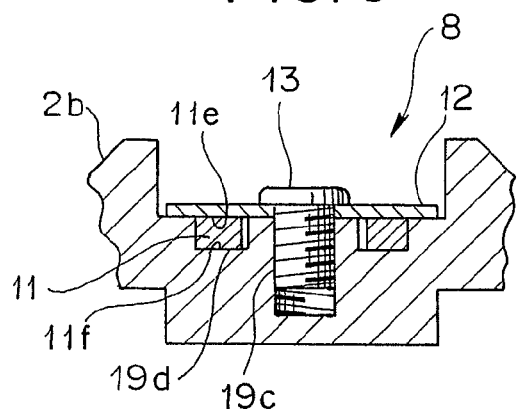
FIG. 6 is a cross-section by a cutting line 6-6 in FIG. 4 illustrating the configuration of the zoom lever.
Figure 7:
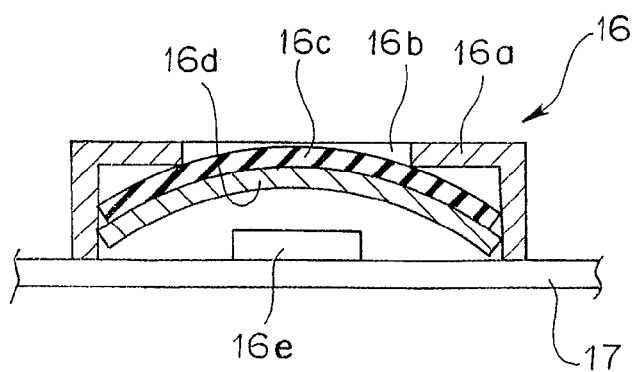
FIG. 7 is a cross-section illustrating a configuration of a click switch.
Figure 8:
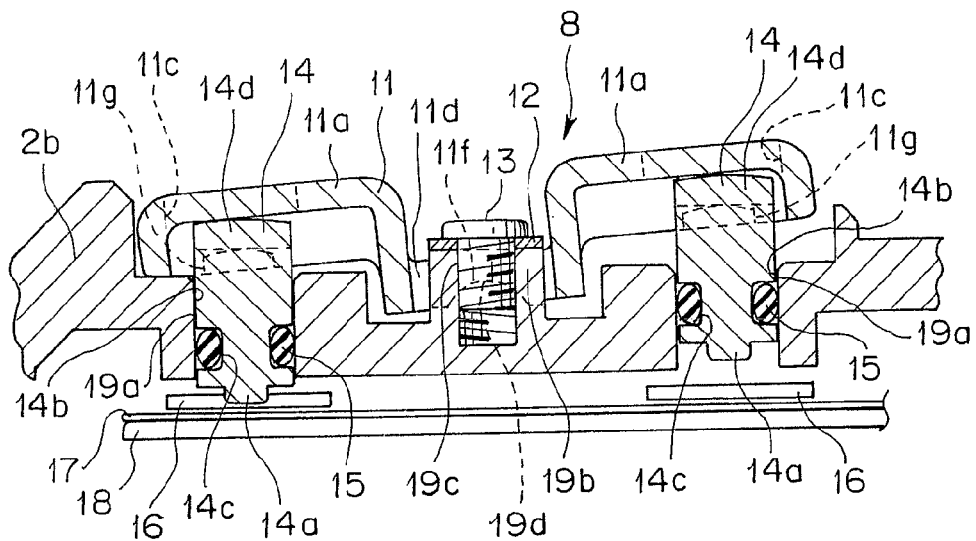
FIG. 8 is a cross-section corresponding to FIG. 4 illustrating a state when one side of the zoom lever is pressingly operated.

Next, a configuration of the zoom lever 8 will be explained referring to FIGS. 3 through 8. FIG. 3 is a cross-section by a cutting line 3-3 in FIG. 5, illustrating a configuration of the zoom lever 8; FIG. 4 is a cross-section by a cutting line 4-4 in FIG. 5, illustrating a configuration of the zoom lever 8; FIG. 5 is a cross-section by a cutting line 5-5 in FIG. 4, illustrating a configuration of the zoom lever 8; FIG. 6 is a cross-section by a cutting line 6-6 in FIG. 4, illustrating the configuration of the zoom lever 8; FIG. 7 is a cross-section illustrating a configuration of a click switch 16; and FIG. 8 is a cross-section corresponding to FIG. 4, illustrating a state when one side of the zoom lever 8 is pressingly operated.

As described above, the zoom lever 8 is formed to be a lever-shaped member for changing the focal length of the shooting optical system 3 from the telescopic focal length side to the wide angle focal length side, and when the one end side is pressed, the focal length of the shooting optical system 3 is changed to the telescopic focal length side and when the other end side is pressed, the same is changed to the wide angle focal length side.

The zoom lever 8 comprises a lever member 11 that constitutes a balancing mechanism, a pressing plate 12 and a screw 13 for attaching the lever member 11 to the rear cover 2b, two shaft members 14 that constitute a pressing operation member, each of O-rings 15 that are respectively attached to the two shaft members 14, and each of the click switches 16 to be pressed by the aforementioned shaft member 14.

The aforementioned click switch 16 is mounted on a flexible printed circuit board 17 for a switch, and the flexible printed circuit board 17 for the switch is further attached to a fixing board 18 that is provided inside of the camera 1.

The aforementioned lever member 11 is formed by connecting a pair of left and right pressing operation portions 11a by a bridge portion 11b. Two elongated oval-shaped continuous holes 11c for circulating air and water are disposed in the aforementioned pressing operation portions 11a, respectively, as shown in FIGS. 3 and 5. A hole 11d for penetrating a boss 19b protruding from the rear cover 2b is formed in the aforementioned bridge portion 11b. A diameter of the hole 11d is larger than that of an outer peripheral face of the boss 19b so that the lever member 11 does not contact the boss 19b even when the lever member 11 swings. In addition, a sliding convex portion 11e having an R-face, namely a shape of a cylindrical surface, is formed at an upper face of the bridge portion 11b of the lever member 11 and a sliding concave portion 11f having an R-face, namely a shape of an internal face of a cylindrical hole is formed at a lower face thereof, respectively. A sliding convex portion 19d having an R-face, namely a shape of a cylindrical surface, is formed at both sides of the boss 19b of the rear cover 2b and the sliding convex portion 19d contacts the sliding concave portion 11f so as to swingably support the lever member 11.

The pressing plate 12 is mounted on the bridge portion 11b of the lever member 11. Both end sides of the pressing plate 12 contact the sliding convex portion 11e and a center of the pressing plate 12 contacts the boss 19b. Further, the lever member 11 is attached to the rear cover 2b by screwing a screw 13 into a screw hole 19c of the boss 19b through a hole formed at a center of the pressing plate 12.

The lever member 11 is configured to press the shaft member 14 into an inside of the camera 1 in a shaft direction by a bottom face of a portion between a pair of continuous holes 11c of the pressing operation portions 11a. Further, a hooking convex portion 11g for pulling up the shaft member 14 toward outside of the camera 1 in a shaft direction by fitting into a side flange 14d formed at an upper end portion of the shaft member 14 is provided. An upper face of the hooking convex portion 11g is formed into an R-face, namely a shape of a cylindrical surface and is configured such that force in a shaft direction is stably transmitted to the side flange 14d even when the lever member 11 is slanted due to a swinging action thereof.

The shaft member 14 has an approximately cylindrical shape and is provided with the side flange 14d at an upper part thereof, as mentioned above, and a pressing convex portion 14a at a lower end thereof. In addition, an O-ring groove 14c is formed at a peripheral face 14b of the shaft member 14. Further, an upper end face of the shaft member 14 is also formed to be an R-face, namely a shape of a cylindrical surface and is configured such that pressing force of the lever member 11 is stably transmitted as force for displacing the shaft member 14 in a shaft direction even when the lever member 11 is slanted due to a swinging action thereof.

An O-ring 15 is attached to each O-ring groove 14c of each shaft member 14.

The two shaft members 14, to which the O-ring 15 is attached is fit into two round shaped shaft holes 19a formed in the rear cover 2b in a manner so as to be perpendicular to a surface of the rear cover 2b, such that the shaft member 14 is slidable in a shaft direction. At this moment, an inside of the camera 1 is kept watertight against an outside of the camera 1 by an effect of the O-ring 15. Further, so as to decrease frictional force that occurs when the shaft member 14 slides in a shaft direction, grease or the like is coated around the peripheral face of the shaft member 14. As a result, the shaft member 14 can be smoothly displaced in a shaft direction, even when the O-ring 15 is attached to the O-ring groove 14c (refer to a mathematical formula, described later).

The click switch 16 mounted on the flexible printed circuit board 17 for the switch is configured as schematically shown in FIG. 7.

Namely, for example, a round hole 16b is formed at an upper face of a chassis 16a which is formed to have a short cylindrical shape with an insulating material. An insulating rubber curtain 16c is disposed inside of the round hole 16b in a manner so as to seal the round hole 16b, and further, a click spring 16d made of metal formed into a convex face shape is disposed in a manner so as to upwardly press the rubber curtain 16c. An electric contact point 16e is formed at a lower side of the click spring 16d sandwiching space of a predetermined distance between the click spring 16d and the same. The click spring 16d and the electric contact point 16e are respectively connected to a circuit side (not shown) through signal lines.

Further, when the shaft member 14 is pressed down and the pressing convex portion 14a presses the rubber curtain 16c and the click spring 16d via the round hole 16b, the click spring 16d and the electric contact point 16e are electrically turned on and by detecting the resultant electric connection, it is determined whether the click switch 16 is turned on or turned off.

Furthermore, when a pressing force from the pressing convex portion 14a of the shaft member 14 is lost, the click spring 16d and the electric contact point 16e are separated at the predetermined distance, i.e., return to a state shown in FIG. 7, by returning force of the click spring 16d.

FIG. 8 illustrates a state when one of two pressing operation portions 11a provided in the zoom lever 8 is pressingly operated by an operator with his/her finger or the like.

Namely, in the zoom lever 8, a bottom face of a pressed side of the pressing operation portion 11a displaces the shaft member 14 toward the inside of the camera 1 in a shaft direction and the pressing convex portion 14a of the shaft member 14 turns on the click switch 16. At this moment, the other shaft member 14 is displaced toward outside of the camera 1 in a shaft direction because the side flange 14d is hooked with the hooking convex portion 11g.

Next, pressure balance generated when the zoom lever 8 is underwater is described.

As is clear from the aforementioned configuration, the zoom lever 8 rotates around a portion at which the sliding concave portion 11f and the sliding convex portion 19d contacts, serving as a fulcrum. Further, when one of pressing operation portions 11a (in detail, a contacting position, at which the pressing operation portion 11a contacts the upper end face of the shaft member 14) serves as a point of force, the other pressing operation portion 11a (in detail, a contacting portion, at which the side flange 14d contacts the hooking convex portion 11g) serves as a point of action.

At this moment, a distance between the fulcrum and one of the pressing operation portions 11a (first contacting point, i.e., a first point of force, or a second point of action) is defined as R1, and a distance between the fulcrum and the other pressing operation portion 11a (second contacting point, i.e., a first point of action, or a second point of force) is defined as R2. Further, a minimum cross-sectional area of the shaft hole 19a (a cross-sectional area of a boundary between water and air), in which the shaft member 14 pressed by one of the pressing operation portion 11a is inserted, that is effective against the water pressure is defined as S1, and a minimum cross-sectional area (a cross-sectional area of a boundary between water and air) of the shaft hole 19a, in which the shaft member 14 pressed by the other pressing operation portion 11a is inserted, that is effective against the water pressure is defined as S2. Furthermore, static frictional force, which is mainly caused between the shaft hole 19a and the O-ring 15, when one of the pressing operation portion 11a is pressed, is defined as F1 (refer to FIG. 3), and static frictional force, which is also mainly caused between the shaft hole 19a and the O-ring 15, when the other pressing operation portion 11a is pressed, is defined as F2 (refer to FIG. 3). In addition, hydrostatic pressure at a water depth D(m) (Atmospheric pressure is included in the hydrostatic pressure, same as below) is defined as P(D). Then, force applied to one of the shaft members 14 is found by P(D)×S1, and similarly, force applied to the other shaft members 14 is found by P(D)×S2. Further, the moments of force around the fulcrum are found by P(D)×S1×R1, and P(D)×S2×R2, respectively. Furthermore, the moments of force around a fulcrum generated by static frictional force are found by F1×R1, and F2×R2, respectively. Accordingly, a condition for the moment of force to be balanced is found by following mathematical formula.

$$P \times S1 \times R1 + F1 \times R1 = P \times S2 \times R2 + F2 \times R2 \quad \text{[Mathematical Formula 1]}$$

Accordingly, a cross-sectional area of two shaft holes 19a, distance between the fulcrum and each of two pressing operation portions 11a, material and a shape of the O-rings 15 and the shaft hole 19a, and the like are configured to satisfy the mathematical formula 1 (in other words, to bring a balance of rotation of the lever member 11 caused by the water pressure).

Further, the pair of aforementioned pressing operation portions 11a and the O-ring 15 are configured such that each of the conditions shown by a following mathematical formula 2 is satisfied against a predetermined water depth, for example, water pressure P(D1) at a designed water depth D1.

$$P(D1) \times S1 \gg F1$$

$$P(D1) \times S2 \gg F2 \quad \text{[Mathematical Formula 2]}$$

Furthermore, in the example shown in FIGS. 3 through 8, conditions which is considered to be most natural, i.e., S1=S2 and R1=R2 are determined for two of the click switches 16 that have functions opposite each other, i.e., zooming-in function and zooming-out function (in other words, there is no need to differentiate frequency of use of the click switch 16 or importance of the click switch 16).

Figure 9:
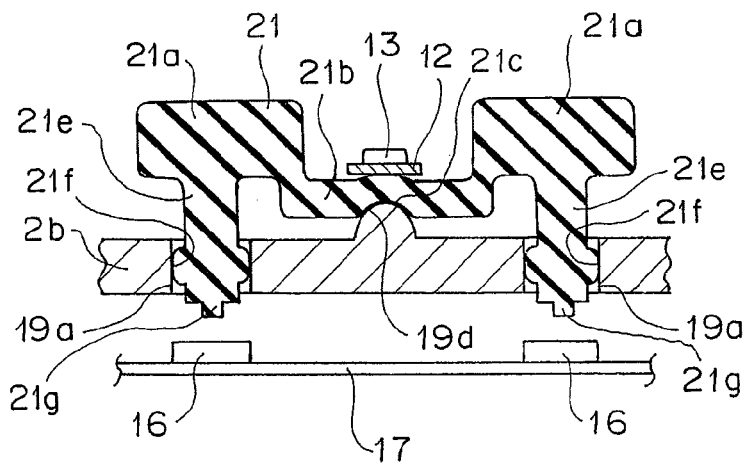
FIG. 9 is a cross-section illustrating a first variation of an operating switch.
Figure 10:
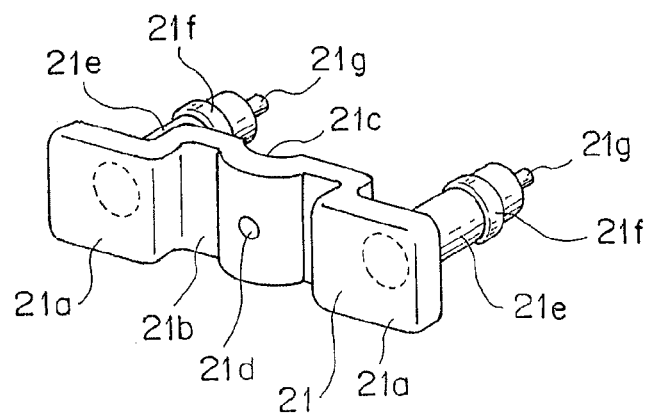
FIG. 10 is a perspective view illustrating the first variation of the operating switch.

Next, a first variation of the operating switch, such as the zoom lever 8 and etc. will be explained referring to FIGS. 9 and 10. FIG. 9 is a cross-section illustrating the first variation of the operating switch, and FIG. 10 is a perspective view illustrating the first variation of the operating switch.

The zoom lever 8 of the first variation is configured by integrally forming the lever member 11, the shaft member 14, and the O-ring 15 by relatively hard rubber or the like having elasticity.

That is, a lever shaft member 21 is formed by connecting two pressing operation portions 21a, corresponding to the pressing operation portions 11a, by a bridge portion 21b. A screw hole 21d for penetrating the screw 13 is formed at the center of the bridge portion 21b and a sliding concave portion 21c having the same function as that of the sliding concave portion 11f is formed at the bottom face side of the bridge portion 21b. Further, shaft portions 21e, respectively corresponding to the shaft members 14, are extending from two of the pressing operation portions 21a, and a pressing convex portion 21g, corresponding to the pressing convex portion 14a is formed at a tip end of the shaft portion 21e. In addition, a flange portion 2 if that has a similar function as that of the O-ring 15 is formed around the peripheral face of the shaft portion 21e.

According to the aforementioned configuration, the number of parts can be decreased and the manufacturing cost thereof can be thereby decreased.

Figure 11:
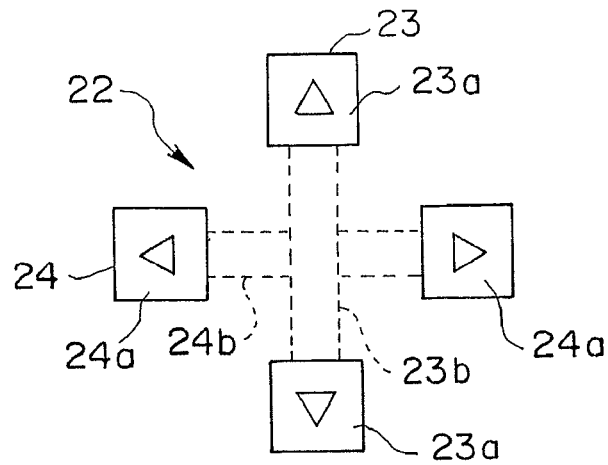
FIG. 11 is a plan view partially including a see-through view illustrating a second variation of the operating switch.

A second variation relating to an operating switch having a configuration similar to the zoom lever 8 will be explained referring to FIG. 11. FIG. 11 is a plan view partially including a see-through view illustrating the second variation of the operating switch.

In the second variation, a cross-shaped switch 22 is formed by orthogonally disposing two operating switches having a structure similar to the zoom lever 8, in a manner so as to overlap the mutual fulcrums.

That is, the cross-shaped switch 22 is configured by combining an operating lever 23 formed by connecting two pressing operation portions 23a by a bridge portion 23b, and an operating lever 24 formed by connecting two pressing operation portions 24a by a bridge portion 24b, in a cross shape.

In addition, although two operating levers are combined to configure the cross-shaped switch 22 in the second variation, four pressing operation portions may be integrally connected by a cross-shaped bridge portion, without being limited by the above-described configuration.

Further, the number of pressing operation portions is not limited to four. For example, three pressing operation portions may be integrally connected by a bridge portion having three branches. In this case, the cross-sectional area of the shaft hole, the distance between the pressing operation portion and the fulcrum, or the like are designed such that water pressure applied to one of the pressing operation portions is balanced out on the basis of the water pressure applied to the other two pressing operation portions.

According to the aforementioned configuration, not only two operating switches but also more than two operating switches can be prevented from being improperly pressed by the water pressure.

Figure 12:
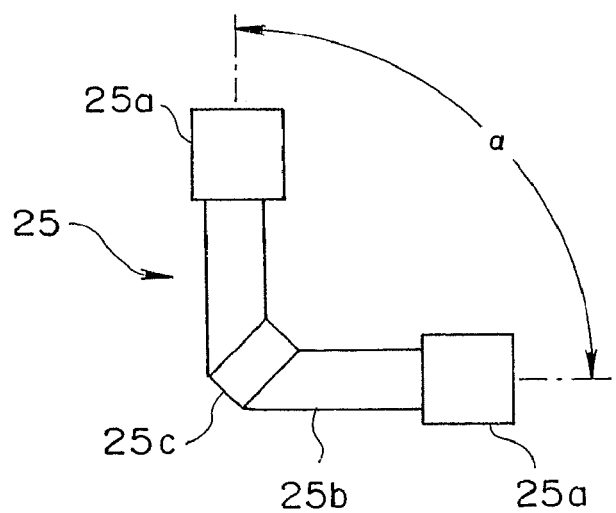
FIG. 12 is a plan view illustrating a third variation of the operating switch.
Figure 13:
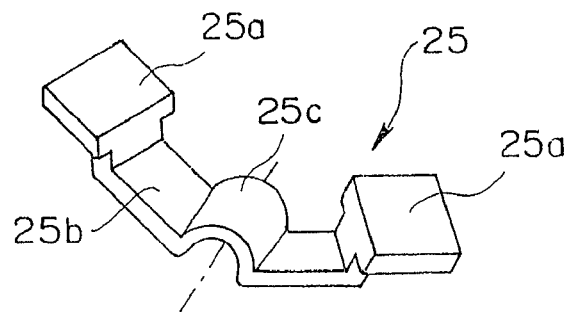
FIG. 13 is a perspective view illustrating the third variation of the operating switch.

Further, a third variation of the operating switch, such as the aforementioned zoom lever 8, or the like will be explained referring to FIGS. 12 and 13. FIG. 12 is a plan view illustrating the third variation of the operating switch and FIG. 13 is a perspective view illustrating the third variation of the operating switch.

In the third variation, the bridge portion is formed into an angled shape.

That is, the lever member 25 is formed by integrally connecting two pressing operation portions 25a through a bridge portion 25b, which is angled into an L-shape. At the angled portion of the bridge portion 25b, a rotating shaft portion 25c is provided and the lever member 25 is configured to be rotatable around a rotating axis passing through the rotating shaft portion 25c indicated by a dashed line in FIG. 13. Further, the fulcrum of the lever member 25 is not located in the lever member 25 but is located at a crossing, at which a straight line connecting two pressing operation portions 25a and an extended straight line of the rotating axis passing through the rotating shaft portion 25c intersect.

In addition, an angle $\alpha$ formed by a straight line connecting a center of the rotating shaft portion 25c with one of the pressing operation portions 25a and that connecting the center of the rotating shaft portion 25c with the other pressing operation portion 25a has a degree within $0° < \alpha \leq 180°$ and more practically, $90° \leq \alpha \leq 180°$.

Further, in the aforementioned third variation, although the bridge portion is formed into an angled shape, the shape of the bridge portion is not limited thereto. For example, a curved shape, such as a U-shape, an S-shape, or the like is also applicable.

According to the aforementioned third variation, because two pressing operation portions 25a can be connected by a bridge portion formed into a line other than a straight line, flexibility in design concerning a disposition of a member in the camera 1 is advanced.

Figure 14:
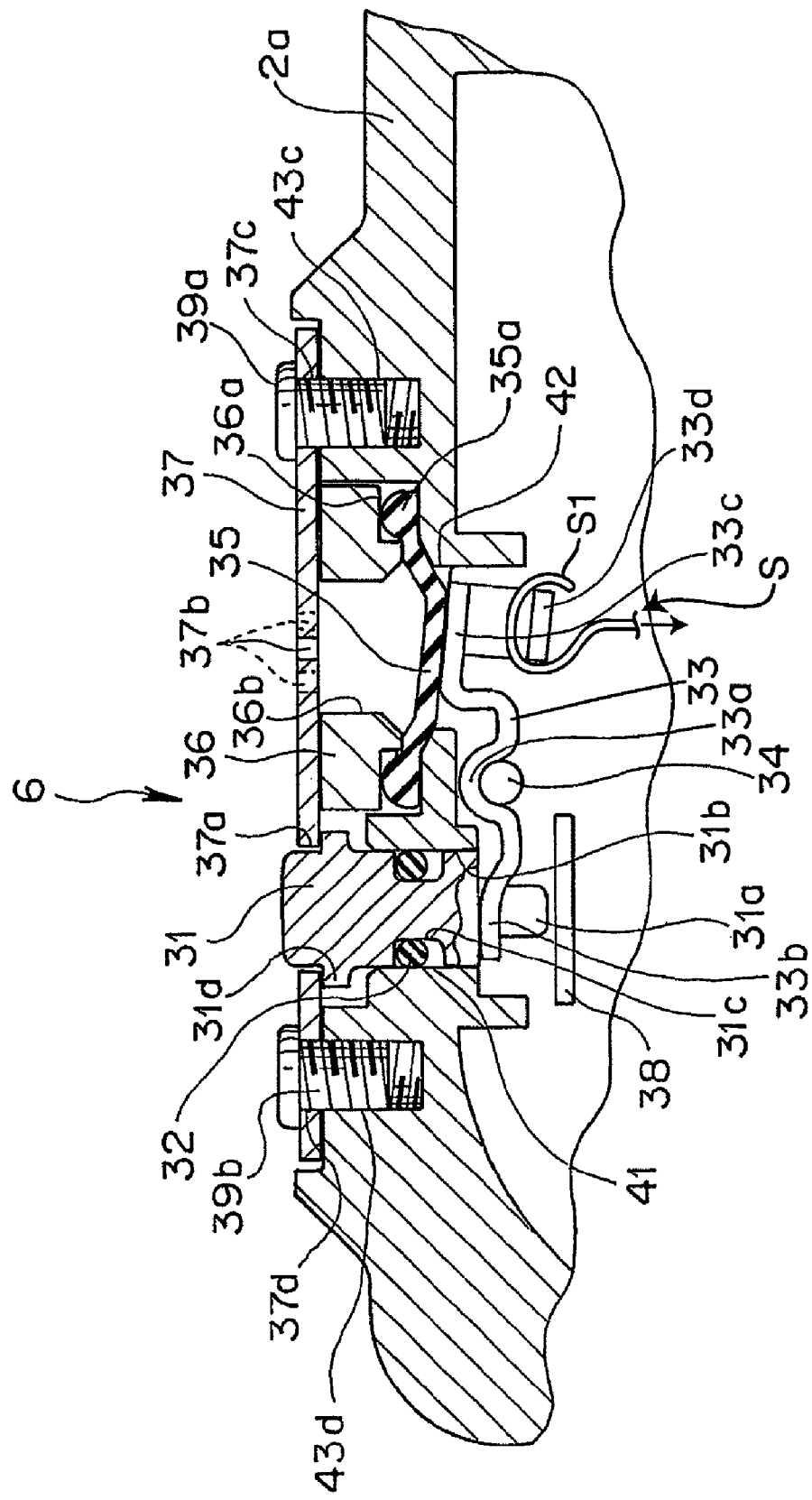
FIG. 14 is a cross-section illustrating a configuration of a power source button in a non-pressed state.
Figure 15:
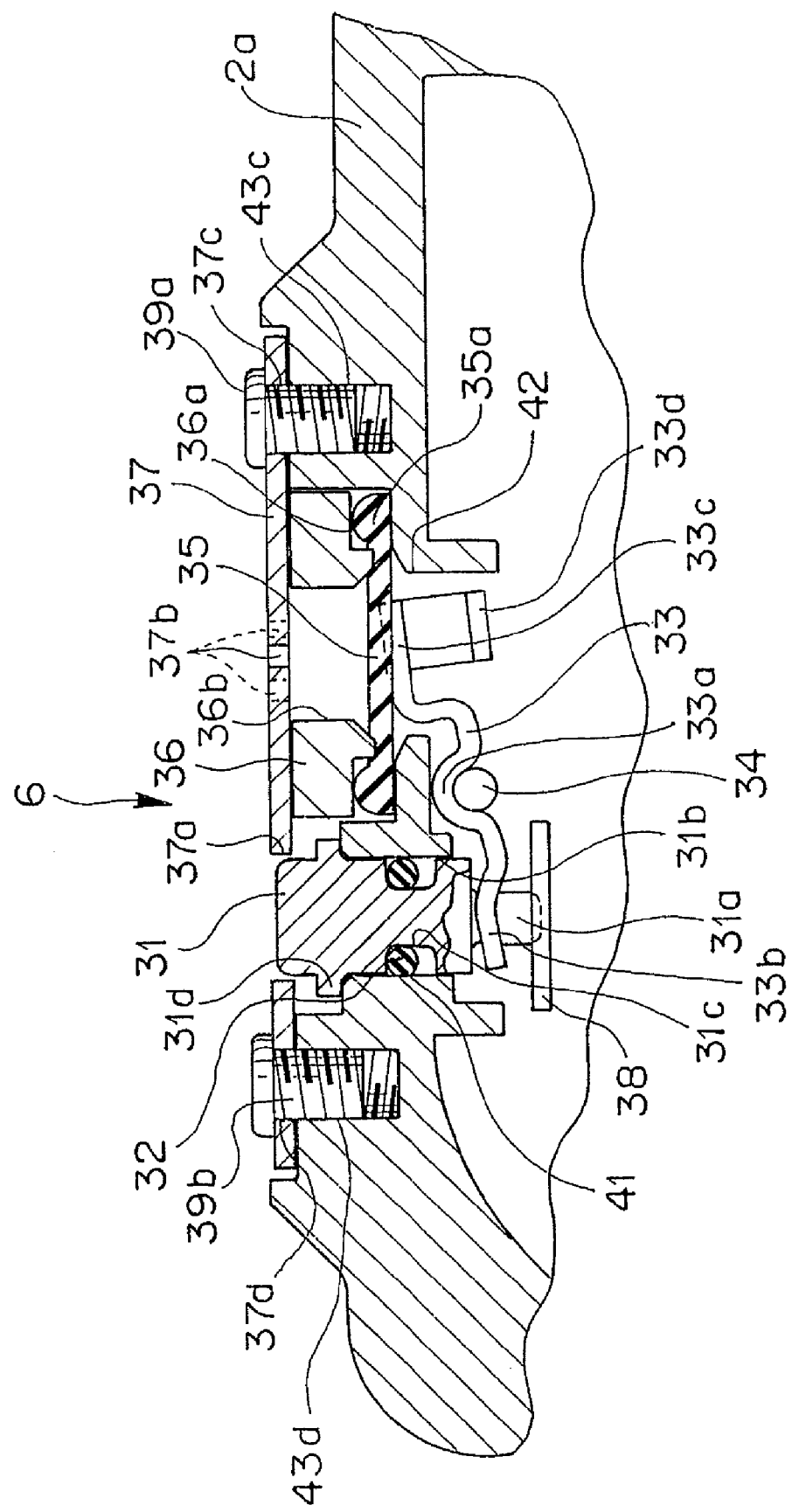
FIG. 15 is a cross-section illustrating a configuration of a power source button in a pressed state.

Next, a configuration of the power source button 6 will be explained referring to FIGS. 1, 14 and 15. FIG. 14 is a cross-section illustrating a configuration of a power source button 6 in a non-pressed state and FIG. 15 is a cross-section illustrating a configuration of a power source button 6 in a pressed state.

The power source button 6 comprises a power button 31 that serves as a pressing operation member, an O-ring 32, a power seesaw 33 that serves as a lever member and a transmitting member, a power shaft 34 that serves as a rotation supporting portion, a power rubber curtain 35a that serves as water pressure detecting means, a water pressure detecting member, a force of water pressure generating member and a curtain member 35, a spacer 36, a side lid 37, and a power switch 38.

The power button 31 is a shaft member having an approximately cylindrical shape, whose upper face side is capable of being pressed by a finger or the like. The power button 31 has a pressing convex portion 31a at a tip end side thereof and an O-ring groove 31c is formed around a peripheral face 31b. In addition, a flange 31d for preventing the power button 31 from falling off the front cover 2a by hooking the same with a button hole 37a of the side lid 37 is formed at an upper portion side of the peripheral face 31b.

The O-ring 32 is attached to the O-ring groove 31c.

A shaft hole 41 having a round shape is formed in the front cover 2a and the peripheral face 31b of the power button 31 is fit into the shaft hole 41. Thereby, the aforementioned O-ring 32 keeps an inside of the camera 1 in a watertight manner.

The aforementioned power seesaw 33 is a lever member configured to be rotatable around the power shaft 34 by a sliding concave portion 33a inside of the front cover 2a and having a fork portion 33b formed at one end thereof. The fork portion 33b is hooked with the tip end side of the power button 31 in a manner so as to protrude from the pressing convex portion 31a and through a clearance in the middle of the fork portion 33b, as shown in FIG. 1. In addition, an arm portion 33c is formed at the other end side of the power seesaw 33 and the force of the water pressure (force of the detected water pressure) applied to the power rubber curtain 35 is received by the arm portion 33c. Further, a spring hook 33d is provided in the arm portion 33c and one end S1 of a spring (biasing means) S (only partially shown) is hooked on the spring hook 33d. Thereby, the power seesaw 33 is biased in a clockwise direction in FIG. 14 about shaft 34. A purpose of providing the spring is to bias the power button 31 in a direction separating from the power switch 38 when the camera 1 is mainly used on land (or underwater in relatively shallow water). Accordingly, the spring is not provided for the purpose of resisting against the water pressure or the like and the spring does not generate such a strong biasing force.

The power rubber curtain 35 that contacts the arm portion 33c of the power seesaw 33 is provided for sealing, in a watertight manner, a hole 42 for detecting the water pressure provided in the front cover 2a and an O-ring portion 35a is formed around the peripheral edge of the power rubber curtain 35.

The spacer 36 is provided with an engaging groove 36a such that the O-ring portion 35a of the power rubber curtain 35 is sandwiched between it and a portion of the front cover 2a in the vicinity of the engaging groove 36a, when the upper end side of the spacer 36 is pressed by the side lid 37. Further, a hole 36b for circulating the air and the water is formed in the spacer 36.

In the side lid 37, the button hole 37a is formed and a plurality of (five in number in the example shown in FIG. 1) continuous holes 37b for communicating with the hole 36b of the spacer 36 are also formed.

The side lid 37 is provided with holes 37e and 37f for respectively engaging with bosses 43e and 43f of the front cover 2a at diagonal corners thereof. In addition, round holes 37c, 37d are formed at side edges facing each other in a longitudinal direction.

On the other hand, screw holes 43c and 43d are formed in the front cover 2a, and the side lid 37 is attached to the front cover 2a by screwing screws 39a and 39b into the screw holes 43c and 43d through the round holes 37c and 37d. As mentioned above, the side lid 37 prevents the power button 31 from coming off and sandwiches the O-ring portion 35a of the power rubber curtain 35 between it and the portion of the front cover 2a in the vicinity of the engaging groove 36a via the spacer 36 so as to maintain the water-tightness of the hole 42 for detecting the water pressure.

Further, the aforementioned power switch 38 is disposed adjacent to the pressing convex portion 31a in a shaft direction of the power button 31. The power switch 38 functions such that the power source of the camera 1 is turned on when pressed in a state of being turned off, whereas the power source of the camera 1 is turned off when pressed in a state of being turned on.

Next, a pressure balance of the power button 6 when being underwater will be explained below.

As is clear from the configuration of the power button 6 described above, the power button 6 rotates around the power shaft 34 serving as a fulcrum. In addition, when the arm portion 33c is assumed as a point of force applied from the power rubber curtain 35 by the water pressure (force caused by detecting the water pressure), the fork portion 33b serves as a point of action.

At this moment, a distance between the fulcrum and the fork portion 33b (point of action) is defined as Ra and a distance between the fulcrum and the arm portion 33c (point of force) is defined as Rb. Further, a minimum cross-sectional area of the shaft hole 41 that is effective against the water pressure (first cross-sectional area at a boundary between water and air) is defined as Sa, and a minimum cross-sectional area of the hole 42 for detecting the water pressure that is effective against the water pressure (second cross-sectional area at a boundary between water and air) is defined as Sb. Then, the cross-sectional areas of the shaft hole 41 and the hole 42 for detecting the water pressure, and the distance between the fulcrum and the point of action and the distance between the fulcrum and the point of force are configured to satisfy the following mathematical formula 3.

$$Sa \times Ra \leq Sb \times Rb \quad \text{[Mathematical Formula 3]}$$

Similar to the above, when the hydrostatic pressure at the water depth D(m) is defined as P(D), the following mathematical formula 4 is obtained by multiplying each side of the mathematical formula 3 by the hydrostatic pressure P(D).

$$P(D) \times Sa \times Ra \leq P(D) \times Sb \times Rb \quad \text{[Mathematical Formula 4]}$$

A left side of the mathematical formula 4 indicates the moment of force around the fulcrum applied to the fork portion 33b through the power button 31 by the hydrostatic pressure and a right side of the mathematical formula 4 indicates the moment of force around the fulcrum applied to the arm portion 33c through the power rubber curtain 35 by the hydrostatic pressure. Accordingly, the mathematical formula 4 means that when the water pressure is applied, the power seesaw 33 is balanced, or the moment of force causing torque in a clockwise direction in FIG. 14 is applied to the power seesaw 33. In other words, the force caused by the water pressure applied to the power button 31 is balanced underwater, or force for separating the power button 31 from the power switch 38 is applied to the power button 31. Thus, the power button 31 is prevented from being improperly pressed by the water pressure underwater.

Further, when static frictional force that occurs when the power button 31 moves is defined as Fa1, and biasing force caused by the spring (not shown) hooked on the spring hook 33d for the power seesaw 33 to move the power button 31 outside of the exterior member 2 is defined as Fa2, and when an internal force including Fa1 and Fa2 is considered, the following mathematical formula is to be satisfied for the power supply button 6.

$$P(D) \times Sa \times Ra - (Fa1 + Fa2) \times Ra \leq P(D) \times Sb \times Rb$$

That is, the power supply button 6 may be constituted such that the mathematical formula is sufficient when the force of the detected water pressure (when expressed by the moment of force, "P(D)×Sb×Rb"), applied to the power button 31 by the power seesaw 33 is equal to or greater than the resultant force of an external pressure, in which the power button 31 receives from the water pressure as external force, (when expressed by the moment of force, "P(D)×Sa×Ra") and internal force, in which the power seesaw 33 receives from internal members (when expressed by the moment of force, "−((Fa1+Fa2)×Ra"), in a direction opposite to the applying direction of the external pressure.

In addition, the power seesaw 33 is set such that the condition of Ra=Rb is approximately satisfied in the examples shown in FIGS. 14 and 15, and in contrast, the shaft hole 41 and the hole 42 for detecting the water pressure are set such that each of the cross-sectional areas thereof satisfies the condition of Sa≦Sb.

When such a power source button 6 is used on land, i.e., in the air, the power source button 6 functions as follows.

When no external force is applied to the power button 31, the flange 31d of the power button 31 knocks against the side lid 37 adjacent to the button hole 37a and contacts the same by the biasing force of the aforementioned spring (not shown). Thereby, the pressing convex portion 31a of the power button 31 stays at a position separated from the power switch 38 at a predetermined distance.

In this state, when the operator presses down the power button 31 with his/her finger or the like against the biasing force of the spring and the frictional force that occurs between the O-ring 32 and the shaft hole 41, the power button 31 is displaced in a shaft direction. Further, the pressing convex portion 31a presses the power switch 38 and the power source of the camera 1 is turned on or turned off.

Thereafter, when the operator releases his/her finger from the power button 31, the power seesaw 33 rotates in a clockwise direction in FIG. 14, by the biasing force of the spring and the movement of the power button 31, in the shaft direction is stopped when the flange 31d knocks against the side lid 37. Thus, the power button 31 is automatically returned by the biasing force of the spring when operated on land.

Next, the power source button 6 functions as follows when used underwater.

Because the configuration satisfying the mathematical formula 3 is adopted, the moment of force shown in the left side and the right side of the mathematical formula 4 is applied to the power seesaw 33 in the water depth D(m) underwater. That is, when no pressing force is applied to the power button 31 by the operator, the biasing force of the spring and the pressing force F in a shaft direction toward outside of the camera 1, which is shown in the following mathematical formula 5 are applied to the power button 31 from the power seesaw 33, and the flange 31d is kept contacting the side lid 37.

$$F = P(D) \times Sb \times Rb/Ra - P(D) \times Sa \quad \text{[Mathematical Formula 5]}$$

In this state, when the operator presses down the power button 31 with his/her finger or the like against the biasing force of the spring and the pressing force F, the power button 31 is displaced in a shaft direction. As a result, the pressing convex portion 31a presses the power switch 38 and the power source of the camera 1 is turned on/off.

Thereafter, when the operator releases his/her finger from the power button 31, the power seesaw 33 rotates in the clockwise direction in FIG. 14 by the biasing force of the spring and the pressing force F, and the movement of the power button 31 in the shaft direction is stopped when the flange 31d knocks against the side lid 37. Thus, the power button 31 automatically returns underwater by the biasing force of the spring and the pressing force F.

Figure 16:
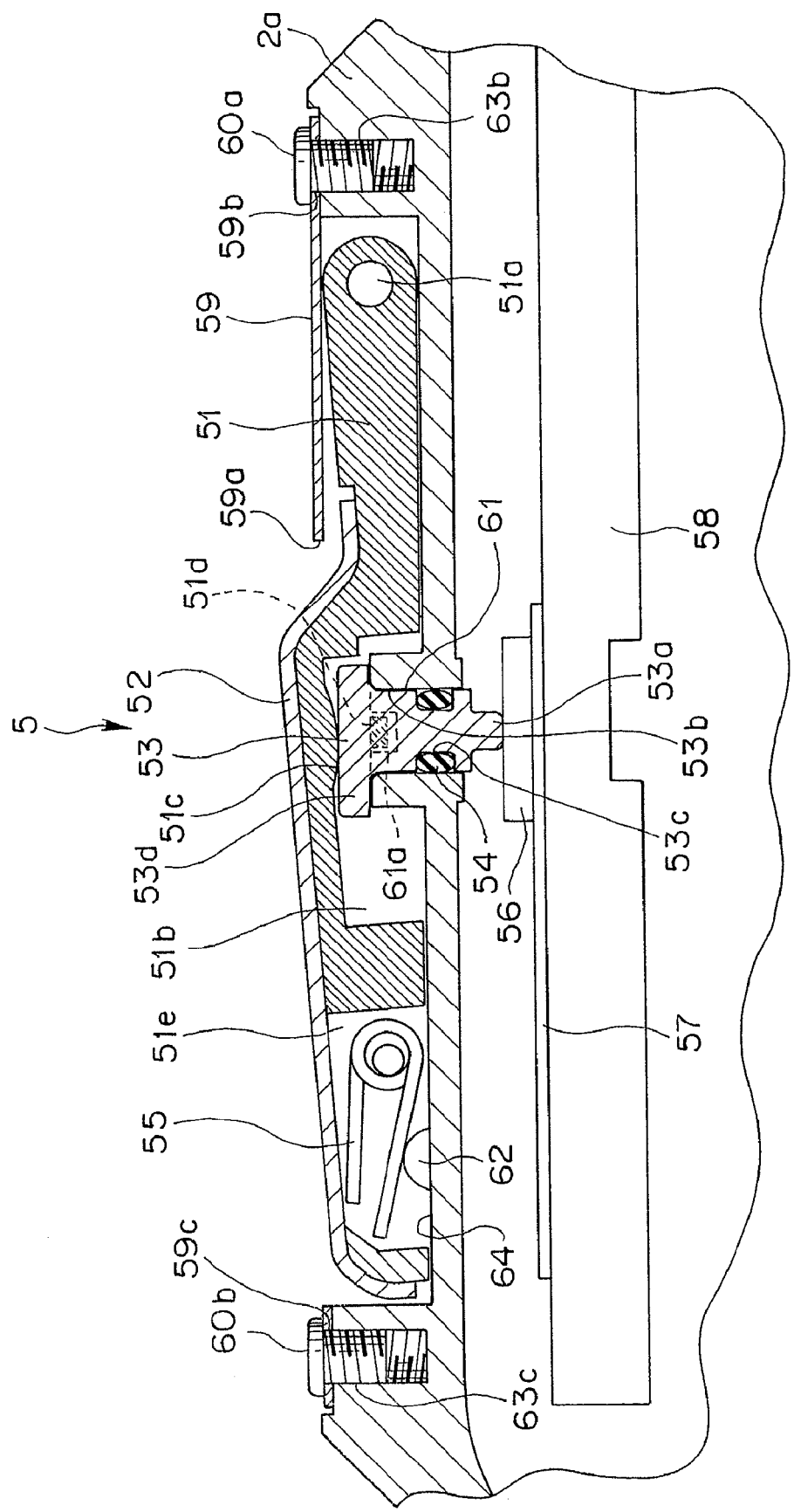
FIG. 16 is a cross-section illustrating a configuration of a release button in a non-pressed state.
Figure 17:
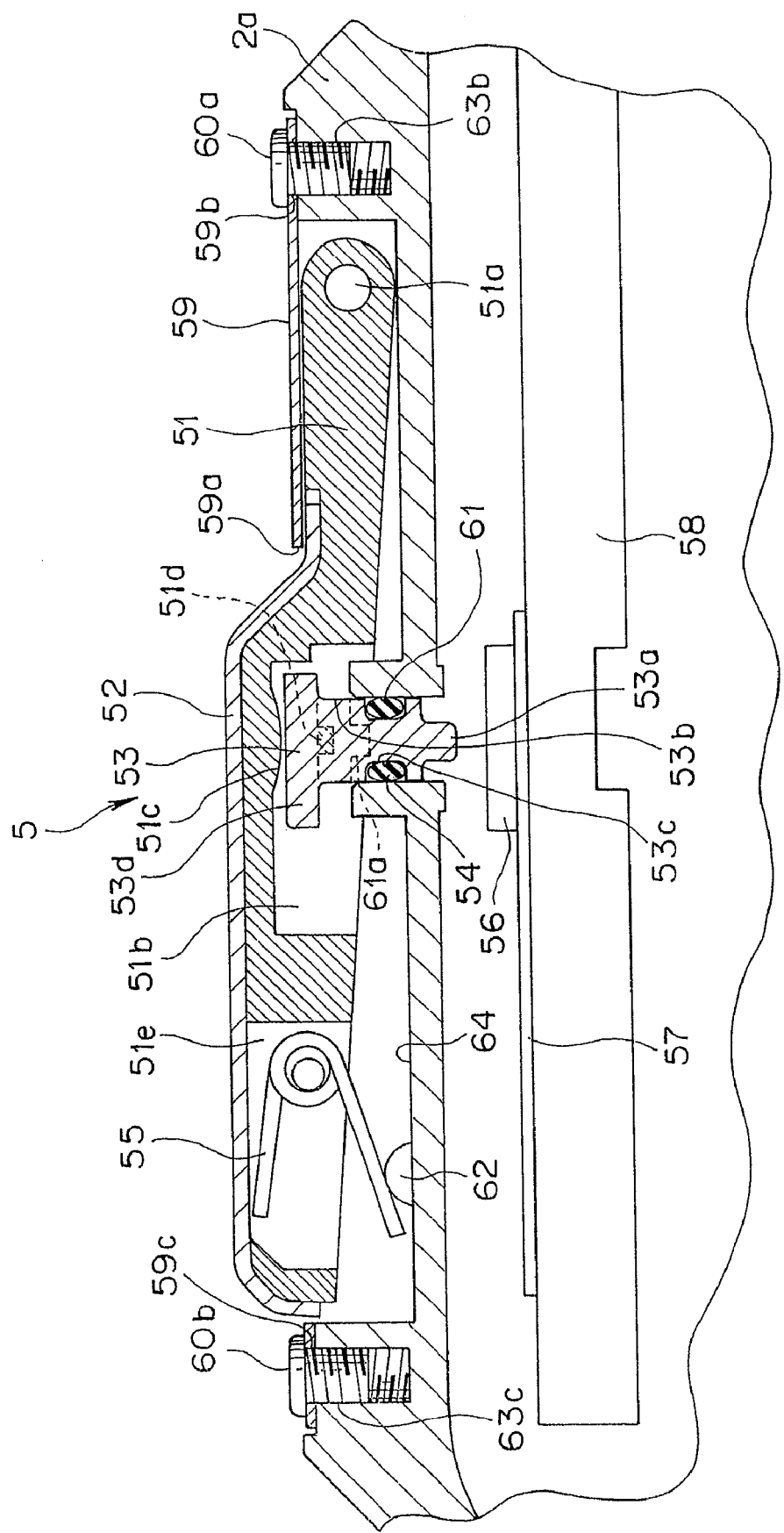
FIG. 17 is a cross-section illustrating a configuration of the release button in a pressed state.

Next, the configuration of the release button 5 will be explained referring to FIGS. 1, 2, 16 and 17. FIG. 17 is a cross-section illustrating a configuration of the release button 5 in a non-pressed state, and FIG. 16 is a cross-section illustrating a configuration of the release button 5 in a pressed state.

The release button 5 comprises a release lever 51, a release cap 52, release shaft 53 serving as a shaft member and waterproof switch means, an O-ring 54, a release spring 55, and a release switch 56.

The release switch 56 is mounted on a flexible printed circuit board for a switch 57 and further, the flexible printed circuit board for the switch 57 is attached to a fixing board 58 provided inside the camera 1.

The release lever 51 is a lever member capable of rotating around a supporting shaft 51a serving as a fulcrum, and is an operating member whose point of force and the point of action is provided at the same side of the supporting shaft 51a, as described later. The release lever 51 has a storage concave portion 51b having an opening at the bottom in the middle part thereof, and at an upper face of the storage concave portion 51b, a pressing convex portion 51c that serves as a pressing portion being formed into an R-face of a cylindrical surface shape is provided. The pressing convex portion 51c is provided for pressing an upper face of the release shaft 53 serving as a point of action, and the pressing force of the release lever 51 can be stably transmitted to the release shaft 53 to move the same in a shaft direction by forming the pressing convex portion 51c into the R-face, even when the release lever 51 rotates in a slanting manner. Further, from a side face of the storage concave portion 51b, a hooking projection 51d to be hooked with a lower end face of the flange 53d that is formed at an upper end of the release shaft 53 is provided. Furthermore, at a tip end side of the release lever 51, viewed from the supporting shaft 51a of the release lever 51, a spring storage chamber 51e is provided.

The release cap 52 is an operating member that covers an upper face side of the release lever 51, and a surface of the release cap 52 is a face of an operating portion that is pressed by the operator with his/her finger or the like.

The release shaft 53 is a shaft member having an approximately cylindrical shape and, is provided with a flange 53d at an upper part thereof, as described above, and a pressing convex portion 53a at a lower end thereof. In addition, an O-ring groove 53c is formed around a peripheral face 53b of the release shaft 53.

An O-ring 54 is attached in the O-ring groove 53c of the release shaft 53.

A concave portion 64 for disposing the release button 5 is formed on the top face of the front cover 2a, and in the middle of the concave portion 64, a bearing hole 61 having a round shape formed in the concave portion 64 is provided in a manner so as to be perpendicular to the upper face of the front cover 2a. The bearing hole 61 having a cylindrical shape is provided in a manner standing up from the bottom face of the concave portion 64, and an escaping concave portion 61a is formed in a manner so as to cut a part of the cylindrical portion. The escaping concave portion 61a serves as a concave portion where the hooking projection 51d enters when the flange 53d of the release shaft 53 contacts an upper end face of the cylindrical portion.

The release shaft 53, to which the O-ring 54 is attached is fit into the bearing hole 61 in a manner so as to be slidable in a shaft direction. In this condition, the internal part of the camera 1 is maintained to be watertight against the outside of the camera 1 by a function of the O-ring 54. Further, grease or the like is coated around a peripheral face of the release shaft 53 so that the frictional force caused when the release shaft 53 slides in the shaft direction is decreased. However, the release shaft 53 is configured such that power is required to some extent for moving the release shaft 53 in a shaft direction to create operational feeling for the operator when the release operation is performed.

Further, the release switch 56 is disposed to intersect a moving path of the release shaft 53 in a shaft direction. Furthermore, the release switch 56 mounted on a flexible printed circuit board 57 for a switch is configured approximately similar to the click switch 16, shown in FIG. 7.

A spring holder 62 protrudes into the concave portion 64 of the front cover 2a and a release spring 55 is disposed in manner so as to be sandwiched between the spring holder 62 and the release lever 51 and the release cap 52, and is in a state of being compressed. The release spring 55 is configured to bias the release lever 51 and the release cap 52 to rotate around the supporting shaft 51a in a clockwise direction in FIG. 16.

The rotation of the release lever 51 and the release cap 52 around the supporting shaft 51a in the clockwise direction from the position shown in FIG. 16 is stopped by being engaged with the button opening 59a of an upper lid 59.

The upper lid 59 is provided with the button opening 59a for exposing the part of the release cap 52 to be operated by the operator by pressing the same with his/her finger or the like. Further, the upper lid 59 is provided with openings 59d and 59e for respectively engaging with the bosses 63d and 63e of the front cover 2a (refer to FIG. 2), at corners thereof diagonally facing each other. Further, round openings 59b and 59c are formed at side edges facing in a longitudinal direction.

On the other hand, screw holes 63b and 63c are formed in the front cover 2a, and the upper lid 59 is attached to the front cover 2a by screwing the screws 60a and 60b into the screw holes 63b and 63c through the round holes 59b and 59c. At this moment, the upper lid 59 serves as a positioning member, as described above, and prevents the release lever 51 and the release cap 52 from dropping out of the camera.

A dynamic configuration of the thus described release button 5 is as follows.

When the release button is pressingly operated, the position on the upper face of the release cap 52, which is pressed by the operator, is defined as the point of force. In addition, the fulcrum is the supporting shaft 51a, as described above. Further, the contacting position of the pressing convex portion 51c and the release shaft 53 is defined as the point of action.

Next, at a time when the release button 5 is returned to an initial position when the operator releases his/her finger or the like from the release button 5, the position, at which the release lever 51 and the release cap 52 receives the returning force of the release spring 55, is defined as the point of force. Further, similar to the above, the fulcrum is the supporting shaft 51a. Furthermore, the contacting position of the hooking projection 51d of the release lever 51 and the flange 53d of the release shaft 53 is defined as the point of action.

In addition, in any case, as illustrated, the distance between the fulcrum and the point of force is configured to be longer than the distance between the fulcrum and the point of action.

Thus, in a disposition of each of the point of force and the point of action, the release spring 55 is provided with biasing force capable of returning the release shaft 53, the release lever 51, and the release cap 52 to the initial position shown in FIG. 17 against the water pressure applied to the release shaft 53 under the water that is shallower than the predetermined water depth.

That is, a distance from the fulcrum to the point of action is defined as Rx, and the distance from the fulcrum to the point of force serves as Ry when the release button 5 returns to the initial position. Further, a minimum cross-sectional area of the bearing hole 61 that is effective against the water pressure is defined as Sx. Furthermore, a maximum frictional force that occurs between the release shaft 53, on which the O-ring 54 is fit, and the bearing hole 61 (usually, the static frictional force) is defined as Fx, and the biasing force generated by the release spring 55 is defined as Fy. At this moment, the mechanism of the release button 5 is configured such that the following mathematical formula 6 is satisfied in the water depth D(m) where the hydrostatic pressure is defined as P(D).

$$Fy \times Ry \geqq (P(D) \times Sx + Fx) \times Rx \qquad \text{[Mathematical Formula 6]}$$

From the mathematical formula 6, for example, biasing force Fy required to the release spring 55 is found as shown in the following mathematical formula 7.

$$Fy \geq (P(D) \times Sx + Fx) \times Rx/Ry \qquad \text{[Mathematical Formula 7]}$$

As described above, because the relationship between the distance from the fulcrum to the point of action (Rx) and the distance from the fulcrum and the point of force (Ry) is configured to be as Rx<Ry, the required force Fy is found to be small compared to the case when the above-mentioned relationship is configured to be Rx=Ry. Thus, because the distance Ry from the fulcrum to the point of force is configured to be greater than the distance Rx from the fulcrum to the point of action, the force of the release spring 55 can be relatively small, namely, the release spring 55 can be small-sized.

Next, an operation of the thus configured release button 5 will be explained.

The operation of the release button 5 when operated on land is basically the same as that when operated underwater.

The state of the release button 5 before being operated is as illustrated in FIG. 17. Further, at this moment, the release cap 52 protrudes toward upside relative to the upper face of the upper lid 59 so as to be easily operated. When the operator presses a pressing operation face of the release cap 52 in this state to photograph, the release cap 52 and the release lever 51 integrally rotate counter-clockwise around the supporting shaft 51a, resulting in applying pressing force against the biasing force of the release spring 55 and the frictional force generated between the release shaft 53, into which the O-ring 54 is fit, and the bearing hole 61.

Thereby, the pressing convex portion 53a of a tip end of the release shaft 53 contacts the release switch 56, and photographing operation is performed, as shown in FIG. 16.

Further, when the operator stops applying the pressing force to the pressing operation face of the release cap 52, the release lever 51 and the release cap 52 rotate around the supporting shaft 51a in a clockwise direction in FIG. 17 by the biasing force of the release spring 55. The biasing force of the release spring 55 at this moment is configured to oppose the water pressure and the frictional force applied to the release shaft 53, since the biasing force satisfies the condition shown in the mathematical formula 7. Thus, when the release lever 51 and the release cap 52 knock and contact the upper lid 59, the returning operation to the position shown in FIG. 17 is completed.

According to the embodiment mentioned above, because the water pressure applied to one operation switch in the zoom lever 8 or the like, which is provided with a plurality of operating switches, is balanced with the water pressure applied to the other operating switch, there is no possibility that the operating switch is improperly pressed by the water pressure even under the water and the pressing force required for the operation does not depend on the water depth. At this moment, because the balancing operation for the water pressure is performed by using the seesaw-shaped lever member, a balancing mechanism for balancing the water pressure can be formed with smaller space. In addition, because the lever member has a rotational balance in consideration of the frictional force that is applied to the O-ring 15 or the like, the embodiment described above can be further widely applied.

Further, because the lever member 11 and the shaft member 14 are separately formed, the shaft member 14 can be movable in a direction perpendicular to a shaft direction, and high waterproof property is thereby securely obtained and the operability can be improved.

Furthermore, because the lever member 11 and the plurality of shaft members 14 are integrally formed of material having elasticity, the number of parts can be decreased and the manufacturing cost can be reduced.

In addition, because the lever member 11 is formed into the angled shape or the curved shape, the flexibility of designs can be improved.

Further, in the power source button 6 or the like, because the water pressure applied to the operating switch is basically balanced with the water pressure applied to the water pressure detecting member by providing the water pressure detecting member (water pressure detecting means), other than the operating switch, there is no possibility that the operating switch is improperly pressed by the water pressure even when the operating switch is operated under the water. Similar to the above, because balancing operation is performed by using the seesaw-shaped lever member, space can be saved. In addition, because the water pressure applied to the water pressure detecting member is configured to be greater than that applied to the operating switch, the power source button 6 is more securely prevented from being improperly pressed by the water pressure. At this moment, because the biasing force of the spring and the frictional force are considered, the embodiment can be more widely applied.

Furthermore, because a shaft member, such as the release shaft 53 is displaced in the shaft direction in the release button 5 or the like by using a lever member such as the release lever 51, even when the frictional force occurs between the O-ring attached to the shaft member and the bearing hole, the pressing force can be decreased and the release button 5 or the like can be operated with an appropriate force. In addition, because the release spring or the like for returning the release button 5 to a non-operating position is disposed to a position farther than the distance between the fulcrum and the shaft member, the force required to the release spring can be decreased and the release spring can be small. At this moment, a spring for general use can be used as a release spring by adjusting a length or the like of the lever member, and the manufacturing cost can be decreased.

Thus, a switch mechanism usable underwater capable of saving the space that does not depend on the water pressure can be provided. Further, the force for operating the pressing operation member can be adjusted. Furthermore, the force for operating the pressing operation member underwater can be set to be the same as that on land as the occasion demands.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A switch mechanism usable underwater comprising:
   an exterior member;
   watertight switch means provided along the exterior member to maintain water-tightness with respect to water pressures not greater than a predetermined water pressure;
   an operation member which includes an operation portion and a pressing portion for pressing the watertight switch means, a rotational axis portion arranged near one end of the operation member, the pressing portion being positioned between the operation portion and the rotational axis portion; and
   biasing means which causes the operation member to rotate around the rotational axis portion by generating a biasing force that is greater than an amount of force generated at the watertight switch means when said predetermined water pressure is applied to the watertight switch means, the biasing force being applied in a direction to move the operation portion of the operation member away from the exterior member; and a positioning member which limits movement of the operation member around the rotational axis portion with respect to the exterior member against the biasing force of the biasing means.

2. The switch mechanism according to claim 1, wherein the exterior member includes a concave portion,
the watertight switch means is disposed in the concave portion of the exterior member,
the positioning member is configured to cover at least a part of the concave portion, and
when the operation member is released, the operation portion of the operation member at least partially protrudes from the positioning member.

3. The switch mechanism according to claim 1, wherein the operation member engages an edge of the positioning member to limit movement of the operation member.

4. The switch mechanism according to claim 1, further comprising a shaft forming a sliding watertight seal with an opening in the exterior member and having one end engaged at a first point of action with said pressing portion and an opposite end operating a release switch when the operation member is pressed.

5. The switch mechanism according to claim 4, wherein a distance between the axis portion and the first point of action is less than a distance between a point of force at which the biasing means engages the operation member and the axis portion.

6. The switch mechanism according to claim 5, wherein the operation member is provided with a projection for engaging a flange on said shaft at a second point of action to disengage the shaft from the release switch when under the influence of the biasing means, and a distance between the axis portion and the second point of action is less than a distance between said point of force and the axis portion.

7. The switch mechanism according to claim 5, wherein the biasing force applied at the point of force is at least equal to a frictional force between the shaft and the hole and a water pressure acting on an effective cross-sectional area at said first point of action to prevent said shaft from engaging the release switch when the water pressure applied to the external member is not greater than said predetermined water pressure.

8. A switch mechanism usable underwater comprising:
an exterior member;
a watertight switch arranged along the exterior member to maintain water-tightness with respect to water pressures not greater than a predetermined water pressure;
an operation member which includes an operation portion and a pressing portion for pressing the watertight switch, a rotational axis portion arranged near one end of the operation member, the pressing portion being positioned between the operation portion and the rotational axis portion; and a biasing member which causes the operation member to rotate around the rotational axis portion by generating a biasing force that is greater than an amount of force generated at the watertight switch when said predetermined water pressure is applied to the watertight switch, the biasing force being applied in a direction to move the operation portion of the operation member away from the exterior member; and a positioning member which limits movement of the operation member around the rotational axis portion with respect the exterior member against the biasing force of the biasing member.

9. The switch mechanism usable underwater according to claim 8, wherein
the exterior member includes a concave portion,
the watertight switch is disposed in the concave portion of the exterior member,
the positioning member configured to cover at least a part of the concave portion, and
when the operation member is released, the operation portion of the operation member at least partially protrudes from the positioning member.

10. The switch mechanism according to claim 8, wherein the operation member engages an edge of the positioning member to limit movement of the operation member.

11. The switch mechanism according to claim 8, further comprising a shaft forming a sliding watertight seal with an opening in the exterior member and having one end engaged at a first point of action with said pressing portion and an opposite end operating a release switch when the operation member is pressed.

12. The switch mechanism according to claim 11, wherein a distance between the axis portion and the first point of action is less than a distance between a point of force at which the biasing member engages the operation member and the axis portion.

13. The switch mechanism according to claim 12, wherein the operation member is provided with a projection for engaging a flange on said shaft at a second point of action to disengage the shaft from the release switch when under the influence of the biasing member, and a distance between the axis portion and the second point of action is less than a distance between said point of force and the axis portion.

14. The switch mechanism according to claim 12, wherein the biasing force applied at the point of force is at least equal to a frictional force between the shaft and the hole and a water pressure acting on an effective cross-sectional area at said first point of action to prevent said shaft from engaging the release switch when the water pressure applied to the external member is not greater than said predetermined water pressure.

* * * * *